July 12, 1932. J. B. WHITACRE 1,867,294

METHOD OF SALT GLAZING BRICK AND OTHER CLAY PRODUCTS

Filed Aug. 14, 1931

INVENTOR

BY J.B.Whitacre

Frease and Bishop ATTORNEYS

Patented July 12, 1932

1,867,294

UNITED STATES PATENT OFFICE

JOHN B. WHITACRE, OF WAYNESBURG, OHIO, ASSIGNOR TO THE WHITACRE-GREER FIREPROOFING COMPANY, OF WAYNESBURG, OHIO, A CORPORATION OF OHIO

METHOD OF SALT-GLAZING BRICK AND OTHER CLAY PRODUCTS

Application filed August 14, 1931. Serial No. 557,019.

The invention relates to a method of producing a salt or vapor glaze on desired surfaces of ceramic products such as building bricks, blocks, tiles, and the like; and more particularly to a method of producing salt glazed ceramic products from clay in such a manner that the salt glaze, and the color of the glaze and products, are not affected by the composition of the clay.

It is well known that salt glazing is the cheapest known process for producing glazed ceramic products, and the same has commonly been accomplished by throwing common salt onto the fires of a kiln wherein clay products are being fired. The sodium from the salt combines with the silica, alumina and/or other constituents of the clay to form complex silicates.

The glaze thus produced is thin and transparent, but the color thereof has usually been affected by and in many instances determined by the composition of the clay, and particularly by the amount of iron and/or other metallic compounds that are present, as impurities, in the clay, because the atmosphere in the kiln has usually always been reducing in character so that the metallic impurities in the clay change their characteristics from being colorless, with respect to their effect upon the glaze, to have other characteristics materially affecting the color of the salt glaze, probably by absorption of the metallic compounds into the glaze when the glaze is in a semi-liquid state.

Thus, in the past, it has been difficult if not impossible, to make desirable or selected colors of salt glazed bricks, since a light or dark brown color usually resulted when prior methods of salt glazing have been utilized.

This has occurred because the salt has usually been thrown onto the fires at the high temperatures at which the bricks are burned to produce proper vitrification and to develop desired colors in the brick per se, and at these high temperatures the iron or other metallic compounds in the clay has combined with the fused silicates to form a brown colored glaze; and because the kiln atmosphere has usually always been reducing in character following the salting operation so that the impurities and glaze have not been maintained in an oxidized state.

Proper coloring of a glazed ceramic product is a very desirable property and contributes greatly to the value of the same. Salt glazed bricks are being used extensively for the interior walls of corridors and basements of public buildings, because of the ease with which they may be kept clean. However, the demand for salt glazed bricks for such uses requires the same to have a light color, preferably light grey or cream, so that corridors, basements, and the like, will be as light as possible.

Salt glazed bricks have been produced by applying a slip coating to the surfaces of the articles to be glazed, and then glazing the same so that the slip coating, which may be suitably colored, produces the desired color and prevents the iron or other metallic compounds present in the raw clay from dissolving in the salt glaze.

Some of the difficulties encountered in salt glazing bricks enumerated above have also been overcome by utilizing materials other than common salt for producing the glaze, but the added expense which results from such methods and the use of such other materials, in many cases precludes their use.

I have discovered that if an oxidizing atmosphere is maintained in the kiln around the surfaces being glazed after the salting operation until the glaze solidifies, the metallic impurities and glaze can be maintained in an oxidized state so that the color of the glaze and products is not affected by the impurities. In glazing products made from "Ohio No. 5 fire clay" the oxidizing atmosphere is preferably maintained in the kiln after salting until the kiln temperature is 1000° F. or thereabouts.

I have also discovered that iron or other metallic compounds present in "Ohio No. 5 fire clay" do not affect the color of the salt glaze at certain temperatures, and, if the temperature of the ceramic product being glazed, made from such clay, is maintained somewhere between 1750° and 1950° F. during salting, that the color of the clay products, and of the glaze thereon after glazing, will remain substantially the same as the color of the products before glazing.

Moreover, I have discovered, for the purpose of producing a salt glaze on ceramic products made from such clay which is unaffected by the composition of the clay from which the products are made, that in many cases it is desirable to maintain as strong a draft as possible through the kiln, and around the products stacked therein, at all times during and immediately after the salting operation, until the temperature of the clay products has been cooled down to 1400° F. or thereabouts.

And finally, I have discovered, for the purpose of producing salt glaze products of the character described, that in most cases it is desirable to gradually reduce the draft through the kiln and around the products stacked therein, to accurately control the rate of cooling of the products after the temperature of the same is 1400° F. or thereabouts until the temperature of the same reaches 1000° F. or thereabouts.

During the step of cooling from 1400° F. to 1000° F., it is likewise desirable to cool as rapidly as possible, and it is also necessary to maintain an oxidizing atmosphere in the kiln to prevent the metallic impurities in the clay from affecting the color of the salt glaze; but on the other hand, extreme care must be taken that the products are not cooled too rapidly during this period so as to prevent checking or cracking of the glaze.

Accordingly, one of the objects of the present invention is to provide a method of salt glazing ceramic products by vaporizing a glazing material such as common salt or other alkali metal chlorides in the kiln wherein the products have been burned, to form a glaze, the color of which is unaffected by the composition of the clay from which the products are made.

Another object of the present invention is to provide a novel manner of stacking clay products in a kiln, to expose the surfaces of the products to be glazed, so that a strong draft may be maintained in the kiln and around the exposed surfaces at desired times.

A further object of the present invention it to provide a novel manner of salt glazing ceramic products by maintaining an oxidizing atmosphere in the kiln and in and around the surfaces being glazed after salting until the glaze has solidified to such an extent that its color is not affected in any way by metallic impurities which may be present in the clay from which the products are made.

Other objects of the invention will be apparent from the detailed description of the improved method given below.

In the drawing

Similar numerals refer to similar parts throughout the drawing.

Figure 1:
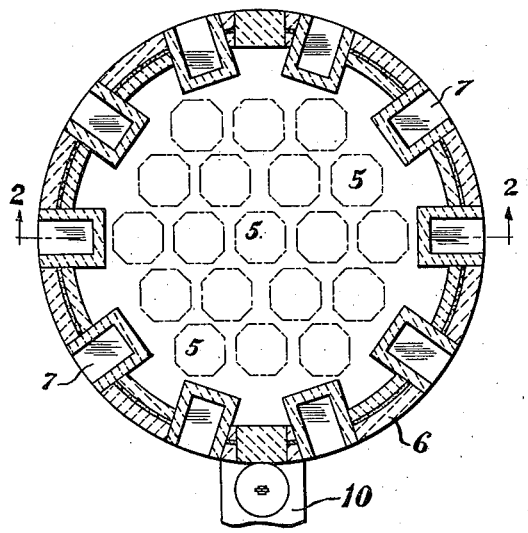
Figure 1 is a plan sectional view of a well known type of kiln diagrammatically showing clay products stacked therein in hollow columns for permitting a strong draft to be maintained when desired in the kiln around the exposed surfaces of the products to be glazed.
Figure 3:
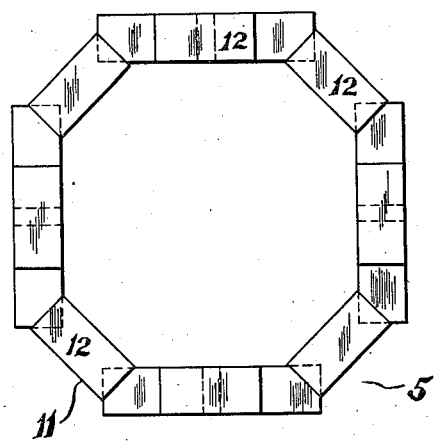
Fig. 3 is a plan view of a stack of bricks piled in the form of a hollow column.
Figure 2:
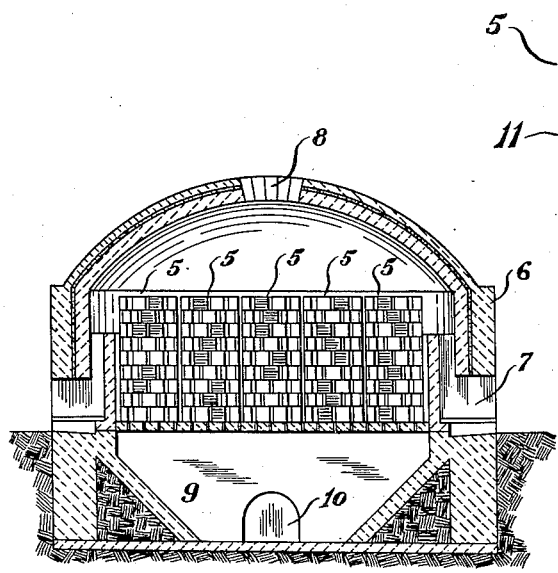
Fig. 2 is a vertical section through a kiln taken on the line 2—2, Fig. 1, showing ceramic products stacked in columns therein.
Figure 4:
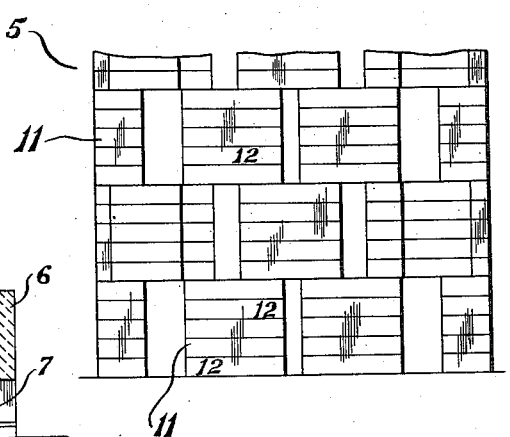
Fig. 4 is an elevation of a fragmentary portion of the hollow column of stacked bricks shown in Fig. 3.

For producing salt glazed ceramic products of the character contemplated by the present invention, the products are preferably set in the kilns so that large air spaces exist between the faces of the products to be glazed. For example, bricks may be conveniently stacked in columns 5 within a kiln 6, having fire boxes 7, a plugged crown opening 8 and bottom flues 9 communicating with the main flue or tunnel 10. In setting the columns 5, tiers 11 of bricks 12 are stacked in spaced, staggered relation with all end and edge faces exposed, as well shown in Figs. 3 and 4, so that the exposed end and edge faces may be glazed.

The bricks are burned in the usual manner in the kiln 5 in an oxidizing atmosphere and at burning temperatures of 2100° F. to 2200° F. and upwards for "Ohio No. 5 fire clay" to vitrify the same and to develop the desired color which may preferably be light grey or cream. The burning temperature for "Ohio No. 5 fire clay" is maintained for some five or six hours.

The particular color developed is dependent upon the burning temperature, so that the burning temperature of 2100° F. to 2200° F. and upwards is determined by the particular brick color desired to be produced.

Instead of salting at the high burning temperature to glaze the bricks, according to common practice, which causes the iron or other metallic compounds existing as impurities in the clay to dissolve and be absorbed in the glaze to produce an undesirable brown color, the temperature of the bricks in the kilns is reduced approximately 300° F. to a salting temperature of between 1750° F. and 1950° F.

Moreover, the reduction in temperature before carrying out the salting operation prevents the products in the kiln from being twisted, or warped, which frequently occurs when salting is carried out at high burning temperatures.

The reduction in temperature is obtained by letting the fires in the fire boxes 7 burn down, and at the same time maintaining an excess of air to maintain an oxidizing atmosphere in the kiln so as to hold the iron or other metallic compounds in the clay in an oxidized condition; and the reduction in temperature to salting temperature is accomplished slowly so as to cool the entire mass of the bricks to between 1750° F. and 1950° F., while the kiln temperature per se may be even lower.

When the brick temperature has reached the salting temperature of 1750° F. to 1950° F., the fire boxes are fired up, and the desired glazing material which may be an alkali metal chloride and preferably common salt, is thrown onto the fires for being vaporized and drawn as a vapor into the kiln. While the salting progresses, a strong draft and an oxidizing atmosphere are maintained in the kiln, and the brick salting temperature of 1750° F. to 1950° F. is likewise maintained.

The salting may preferably be carried on for from three to twelve hours, depending upon the amount of salt which is continued to be thrown onto the fires to produce a desired resulting thickness of glaze on the exposed surfaces of the bricks.

After the necessary amount of salt has vaporized, and burned out, the atmosphere in the kiln is cleared out, the plug in the crown opening 8 is removed, and the ashes in the fire boxes are removed, meanwhile a strong draft is maintained in the kiln to maintain an oxidizing atmosphere therein.

Thereafter, the kiln temperature is cooled as rapidly as possible to approximately 1400° F. by maintaining a very strong draft through the kiln. At the same time, an oxidizing atmosphere is maintained in the kiln to continue to hold the metallic compounds which may be contained in the clay, in an oxidized state so that the same will not have a discoloring effect upon the glaze.

The draft is then gradually reduced so as to more slowly cool the products from a temperature of 1400° F. to 1000° F. or thereabouts, while still maintaining an oxidizing atmosphere in the kiln. During the step of cooling from 1400° F. to 1000° F., it is desirable to cool as rapidly as possible, yet the products cannot be cooled too rapidly during this period, or checks or cracks will occur in the glaze.

The draft is then completely shut off, the crown opening is partially closed and the bricks are cooled slowly to normal temperature, when the kiln is opened and the glazed bricks are removed.

In carrying out the improved method, the iron and/or other metallic compounds in the clay do not dissolve in the glaze, and do not affect the color of the same, the color of the glazed bricks being substantially the same after glazing as before.

It is not intended to limit the scope of the invention to the glazing of bricks, which have been described herein for illustrative purposes only, for the improved method may be successfully carried out for producing salt glazed ceramic products of any character.

Nor is it intended to limit the scope of the invention to the use of common salt for producing the glaze, since any of the well known glazing materials may be used.

Nor is it intended to limit the scope of the invention to the production of glazed bricks having a light grey or cream color, since other colors may be produced by varying the burning temperature, or by adding coloring material to the green clay.

And finally, it is not intended to limit the scope of the invention to a method of salt glazing "No. 5 Ohio fire clay", which is described herein by way of illustration, for other clays and shales may be successfully salt glazed in a similar manner.

Moreover, it is pointed out that the temperatures and temperature ranges set forth herein by way of illustration are those which have been found to be most desirable for successfully salt glazing "No. 5 Ohio fire clay".

However, in salt glazing other clays or shales, the particular temperatures will have different values, although the relation between the temperatures most desirable for carrying out particular steps of the method will bear approximately the same relation to one another. For this reason, the scope of the invention is not intended to be limited to the exact temperatures set forth herein.

I claim:

1. The method of salt-glazing cermic products made from clay containing metallic compounds as impurities, which includes heating the products in a kiln to that temperature required for obtaining a desired color, then volatilizing salt-glazing material in the kiln to salt glaze the products, and then maintaining an oxidizing atmosphere in the kiln and around surfaces being glazed while cooling the products until the glaze has solidified to such an extent that the color of the products is not affected by metallic impurities in the clay.

2. The method of salt-glazing ceramic products made from clay containing metallic compounds as impurities, which includes heating the products in a kiln to that temperature required for obtaining a desired color, then volatilizing salt-glazing material in the kiln to salt glaze the products, and then maintaining the salt glaze in an oxidized state while cooling the products until the glaze has solidified to prevent the metallic impurities in the clay from affecting the color of the glazed products.

3. The method of salt-glazing ceramic products, which includes heating the products in a kiln to that temperature required for obtaining a desired color, then volatilizing a salt-glazing material in the kiln to salt glaze the products, and then maintaining an oxidizing atmosphere in the kiln until the temperature of the same has cooled to 1000° F. or thereabouts.

4. The method of salt-glazing ceramic products which includes heating the products in a kiln to that temperature required for obtaining a desired color, then volatilizing a salt-glazing material in the kiln to salt glaze the products, then rapidly cooling the products in an oxidizing atmosphere to 1400° F. or thereabouts, then more slowly cooling the products in an oxidizing atmosphere to 1000° F. or thereabouts, and then slowly cooling the products.

5. The method of salt-glazing ceramic products made from clay containing metallic compounds as impurities, which includes heating the products in a kiln to that temperature required for obtaining a desired color, then reducing the temperature of the products, and then volatilizing salt-glazing material in the kiln while maintaining the products at the reduced temperature to salt glaze the same without affecting the color of the products by the metallic impurities.

6. The method of salt-glazing ceramic products, which includes heating the products in a kiln to that temperature required for obtaining a desired color, then slowly reducing the temperature of the products approximately 300° F., and then volatilizing salt-glazing material in the kiln while maintaining the products at the reduced temperature to salt glaze the same.

7. The method of salt-glazing ceramic products, which includes heating the products in an oxidizing atmosphere in a kiln to that temperature required for obtaining a desired color, then reducing the temperature of the products in an oxidizing atmosphere approximately 300° F., then volatilizing salt-glazing material in the kiln in an oxidizing atmosphere while maintaining the products at the reduced temperature to salt glaze the same, then rapidly reducing the temperature of the products in an oxidizing atmosphere to approximately 1400° F., and then more slowly cooling the products.

8. The method of salt-glazing ceramic products, which includes heating the products in an oxidizing atmosphere in a kiln to that temperature required for obtaining a desired color, then reducing the temperature of the products in an oxidizing atmosphere approximately 300° F., then volatilizing salt-glazing material in the kiln in an oxidizing atmosphere while maintaining the products at the reduced temperature to salt glaze the same, then rapidly reducing the temperature of the products in an oxidizing atmosphere to approximately 1400° F., then more slowly cooling the products in an oxidizing atmosphere to 1000° F. or thereabouts, and then slowly cooling the products.

9. The method of salt-glazing ceramic products, which includes stacking the products in a kiln in hollow columns with air spaces between the product surfaces to be glazed, heating the products in the kiln to that temperature required for obtaining a desired color, then volatilizing salt-glazing material in the kiln to salt glaze the products, then rapidly cooling the products, then slowly cooling the products, and maintaining an oxidizing atmosphere in the kiln and in and around the air spaces during the heating, salt-glazing and rapid cooling steps.

10. The method of salt-glazing ceramic products, which includes stacking the products in a kiln in hollow columns with air spaces between the product surfaces to be glazed, heating the products in the kiln to that temperature required for obtaining a desired color, then reducing the temperature of the products, then volatilizing salt-glazing material in the kiln while maintaining the products at the reduced temperature to salt glaze the products, and maintaining a strong draft through the kiln and in and around the air spaces during the heating, temperature reducing, and salt-glazing steps.

11. The method of salt-glazing ceramic products which includes heating the products in a kiln to a temperature of 2100° F. and upwards to obtain a desired color, then reducing the temperature of the products, and then volatilizing salt-glazing material in the kiln while maintaining the products at the reduced temperature to salt glaze the products.

12. The method of salt-glazing ceramic products which includes heating the products in a kiln to a temperature of 2100° F. and upwards to obtain a desired color, then reducing the temperature of the products, then volatilizing salt-glazing material in the kiln while maintaining the products at the reduced temperature to salt glaze the products, and maintaining a strong draft through the kiln while maintaining the reduced temperature.

13. The method of salt-glazing ceramic products which includes heating the products in a kiln to a temperature of 2100° F. and upwards to obtain a desired color, then reducing the temperature of the products, then volatilizing salt-glazing material in the kiln while maintaining the products at the reduced temperature to salt glaze the products, then rapidly further reducing the temperature of the products to approximately 1400° F., and then slowy cooling the products.

14. The method of salt-glazing ceramic products which includes heating the products in a kiln to a temperature of 2100° F. and upwards to obtain a desired color, then reducing the temperature of the products to between 1750° F. and 1950° F., and then volatilizing salt-glazing material in the kiln while maintaining the temperature of the products at between 1750° F. and 1950° F. to salt glaze the products.

15. The method of salt-glazing ceramic products which includes heating the products in a kiln to a temperature of 2100° F. and upwards to obtain a desired color, then reducing the temperature of the products to between 1750° F. and 1950° F., and then volatilizing salt-glazing material in the kiln while maintaining the temperature of the products at between 1750° F. to 1950° F. and at the same time maintaining a strong draft through the kiln to salt glaze the products.

16. The method of salt-glazing ceramic products which includes heating the products in a kiln to a temperature of 2100° F. and upwards to obtain a desired color, then reducing the temperature of the products to between 1750° F. and 1950° F., then volatilizing salt-glazing material in the kiln while maintaining the temperature of the products at between 1750° F. and 1950° F. to salt glaze the products, then rapidly further reducing the temperature of the products to approximately 1400° F., and then slowly cooling the products.

17. The method of salt-glazing ceramic products which includes heating the products in a kiln to a temperature of 2100° F. and upwards to obtain a desired color, reducing the temperature of the products to between 1750° F. and 1950° F., volatilizing salt-glazing material in the kiln while maintaining the temperature of the products at between 1750° F. and 1950° F. and at the same time maintaining a strong draft through the kiln to salt glaze the products, rapidly cooling the products to a temperature of approximately 1400° F., and then slowly cooling the products.

In testimony that I claim the above, I have hereunto subscribed by name.

JOHN B. WHITACRE.